(12) United States Patent
Valensa et al.

(10) Patent No.: US 8,171,985 B2
(45) Date of Patent: May 8, 2012

(54) WATER VAPORIZER WITH INTERMEDIATE STEAM SUPERHEATING PASS

(75) Inventors: Jeroen Valensa, Muskego, WI (US);
Adam Kimmel, Union Grove, WI (US);
Michael Reinke, Franklin, WI (US)

(73) Assignee: Modine Manufacturing Company, Racine, WI (US)

( * ) Notice: Subject to any disclaimer, the term of this patent is extended or adjusted under 35 U.S.C. 154(b) by 1115 days.

(21) Appl. No.: 11/939,081

(22) Filed: Nov. 13, 2007

(65) Prior Publication Data
US 2008/0295784 A1   Dec. 4, 2008

Related U.S. Application Data

(63) Continuation-in-part of application No. 11/506,301, filed on Aug. 18, 2006.

(60) Provisional application No. 60/709,556, filed on Aug. 19, 2005.

(51) Int. Cl.
*F28D 7/10*   (2006.01)
*F28F 9/22*   (2006.01)

(52) U.S. Cl. ........................ 165/154; 165/155

(58) Field of Classification Search ............... 165/154, 165/155, 141; 122/160, 367
See application file for complete search history.

(56) References Cited

U.S. PATENT DOCUMENTS

| | | | |
|---|---|---|---|
| 3,217,471 A | | 11/1965 | Silverman |
| 4,059,882 A | * | 11/1977 | Wunder ............... 29/890.036 |
| 4,096,616 A | * | 6/1978 | Coffinberry ............ 29/890.036 |
| 4,284,133 A | * | 8/1981 | Gianni et al. ................ 165/133 |
| 4,305,457 A | * | 12/1981 | Cozzolino .................... 165/154 |
| 4,613,544 A | | 9/1986 | Burleigh |
| 4,650,728 A | | 3/1987 | Matsumura et al. |
| 5,360,679 A | | 11/1994 | Buswell et al. |
| 5,449,568 A | | 9/1995 | Micheli et al. |
| 5,541,014 A | | 7/1996 | Micheli et al. |
| 5,542,467 A | * | 8/1996 | Carpentier ..................... 165/70 |

(Continued)

FOREIGN PATENT DOCUMENTS

JP   06174384 A   *   6/1994

(Continued)

OTHER PUBLICATIONS

International Preliminary Report on Patentability for PCT/US2008/083399, dated May 27, 2010.

(Continued)

*Primary Examiner* — Tho V Duong
(74) *Attorney, Agent, or Firm* — Michael Best & Friedrich LLP

(57) ABSTRACT

The present invention provides a water vaporizer including a first flow path connected to a water inlet, a second flow path for receiving superheated water vapor from the first flow path and being connected to a vapor outlet to exhaust the superheated water vapor, and a third flow path extending between an exhaust inlet and an exhaust outlet and being oriented to transfer heat from an exhaust flow to the superheated water vapor. The water vaporizer can also include a first convoluted fin positioned along the second flow path, and a second convoluted fin positioned along the second flow path adjacent to and separated from the first fin to define a gap extending between the first and second fins along a length of the first fin in a direction substantially parallel to the exhaust flow along the third flow path.

28 Claims, 13 Drawing Sheets

U.S. PATENT DOCUMENTS

| | | | |
|---|---|---|---|
| 5,549,927 A | 8/1996 | Cottone et al. | |
| 5,558,069 A * | 9/1996 | Stay | 123/541 |
| 5,900,329 A | 5/1999 | Reiter et al. | |
| 5,968,680 A | 10/1999 | Wolfe et al. | |
| 6,048,383 A | 4/2000 | Breault et al. | |
| 6,274,259 B1 | 8/2001 | Grasso et al. | |
| 6,379,833 B1 | 4/2002 | Hill et al. | |
| 6,465,118 B1 | 10/2002 | Dickman et al. | |
| 6,475,652 B2 | 11/2002 | Grasso et al. | |
| 6,607,854 B1 | 8/2003 | Rehg et al. | |
| 6,713,204 B2 | 3/2004 | Shimanuki et al. | |
| 6,864,005 B2 | 3/2005 | Mossman | |
| 6,924,051 B2 | 8/2005 | Meissner et al. | |
| 7,037,610 B2 | 5/2006 | Meissner et al. | |
| 2001/0004500 A1 | 6/2001 | Grasso et al. | |
| 2001/0010875 A1 | 8/2001 | Katagiri et al. | |
| 2001/0021468 A1 | 9/2001 | Kanai et al. | |
| 2002/0061426 A1 | 5/2002 | Imaseki et al. | |
| 2002/0086194 A1 | 7/2002 | Blaszczyk et al. | |
| 2003/0010480 A1 | 1/2003 | Shibagaki et al. | |
| 2004/0013918 A1 | 1/2004 | Merida-Donis | |
| 2004/0159424 A1 * | 8/2004 | Reinke et al. | 165/140 |
| 2004/0224191 A1 | 11/2004 | Skiba | |
| 2005/0241232 A1 * | 11/2005 | Reinke et al. | 48/76 |

FOREIGN PATENT DOCUMENTS

| | | |
|---|---|---|
| JP | 2000146378 | 5/2000 |
| JP | 2003232502 | 8/2003 |
| JP | 2007051865 | 3/2007 |
| WO | 02061867 | 8/2002 |

OTHER PUBLICATIONS

PCT/US2008/083399 International Search Report dated Jul. 13, 2009 (2 pages).

* cited by examiner

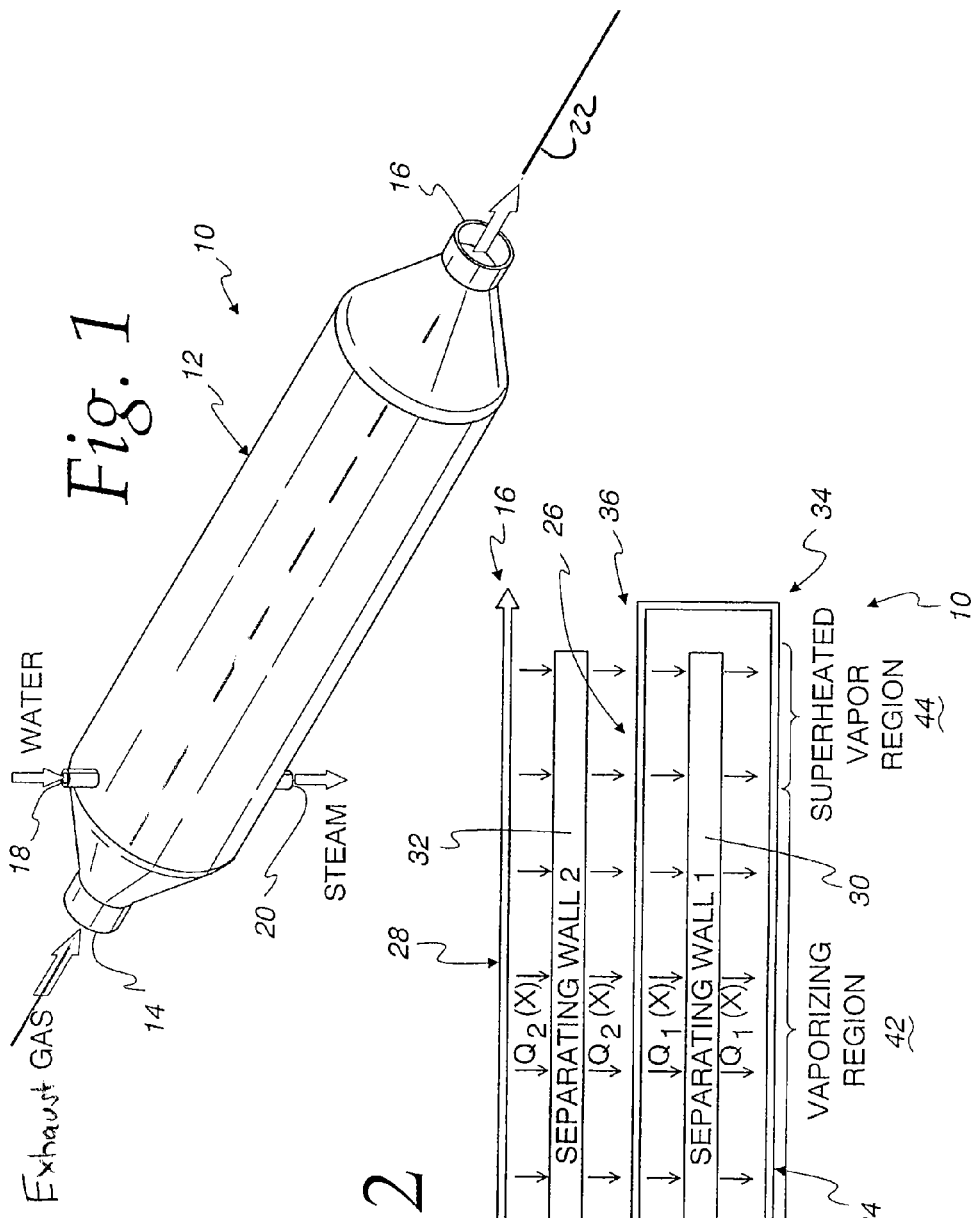

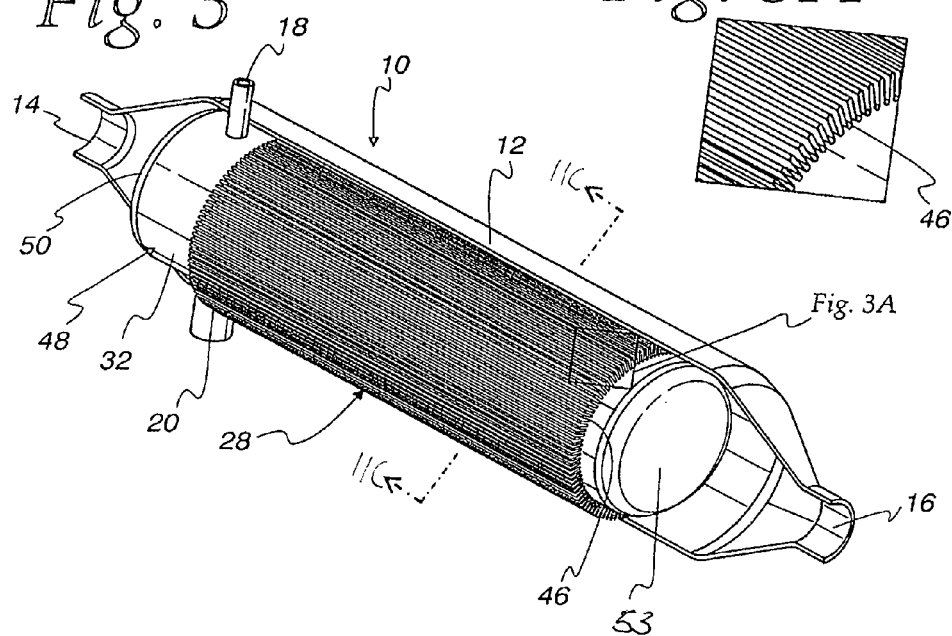
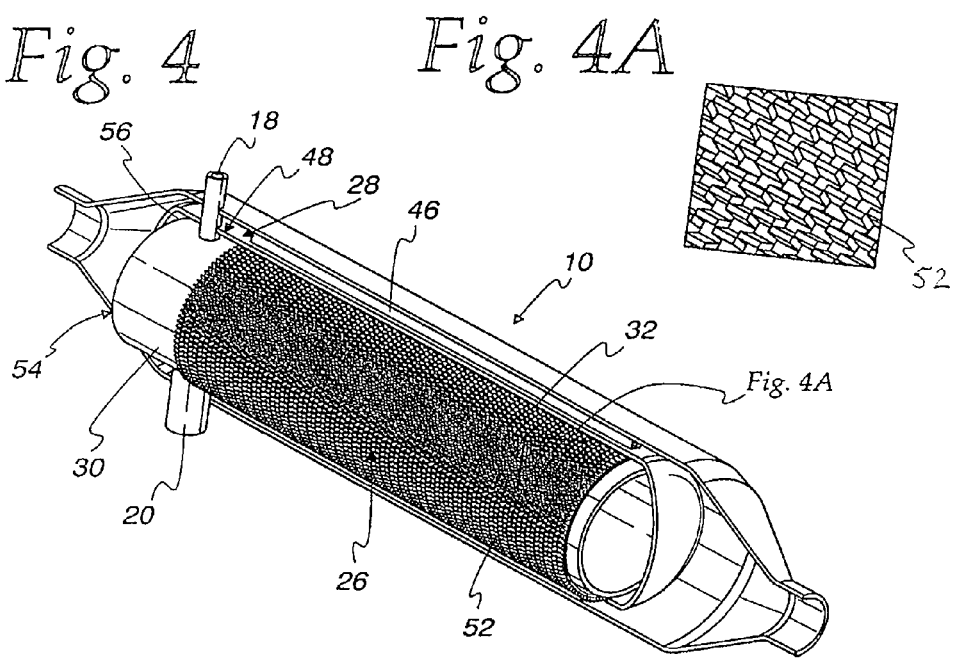

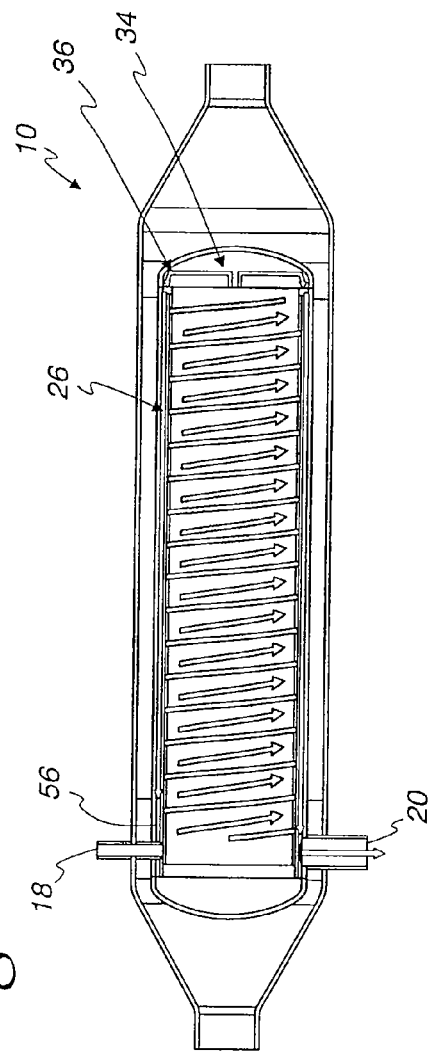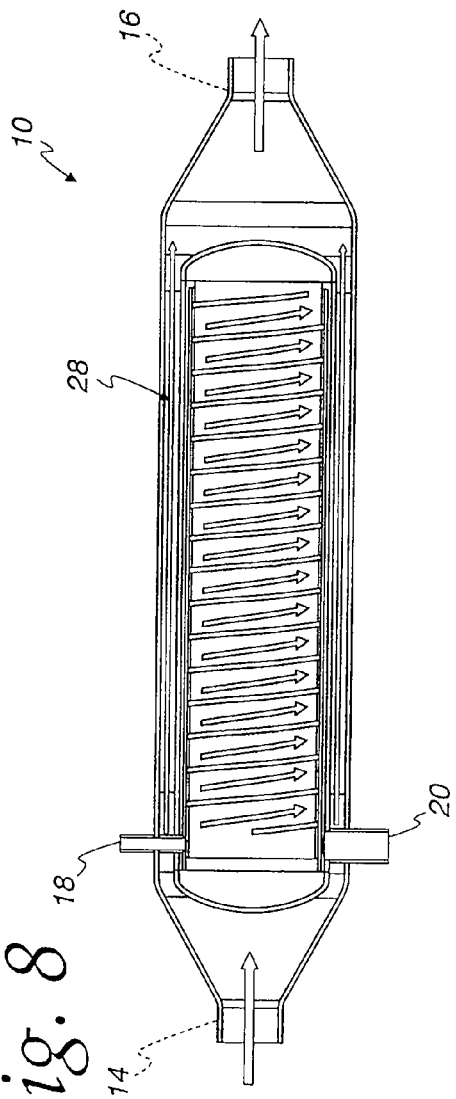

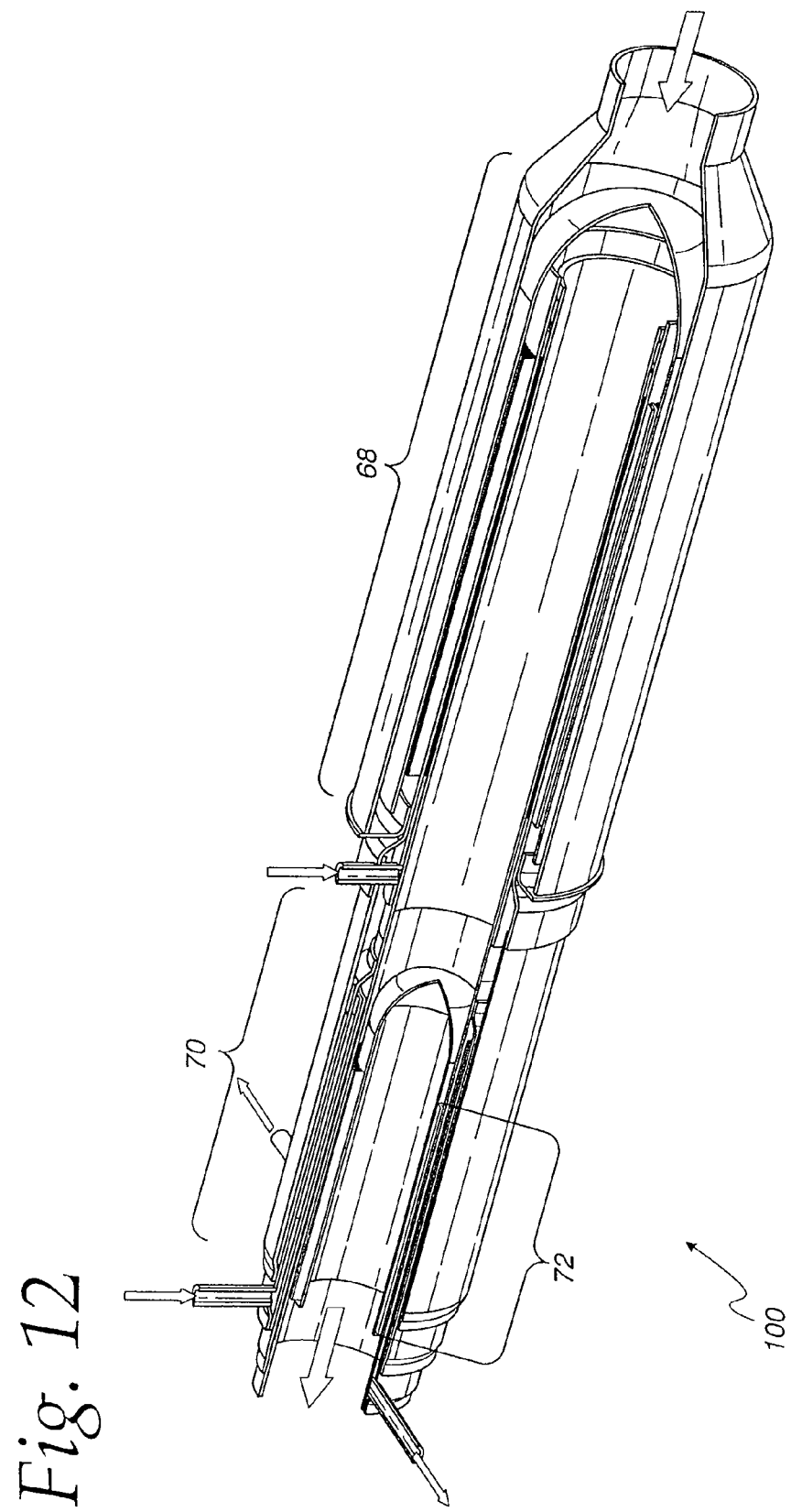

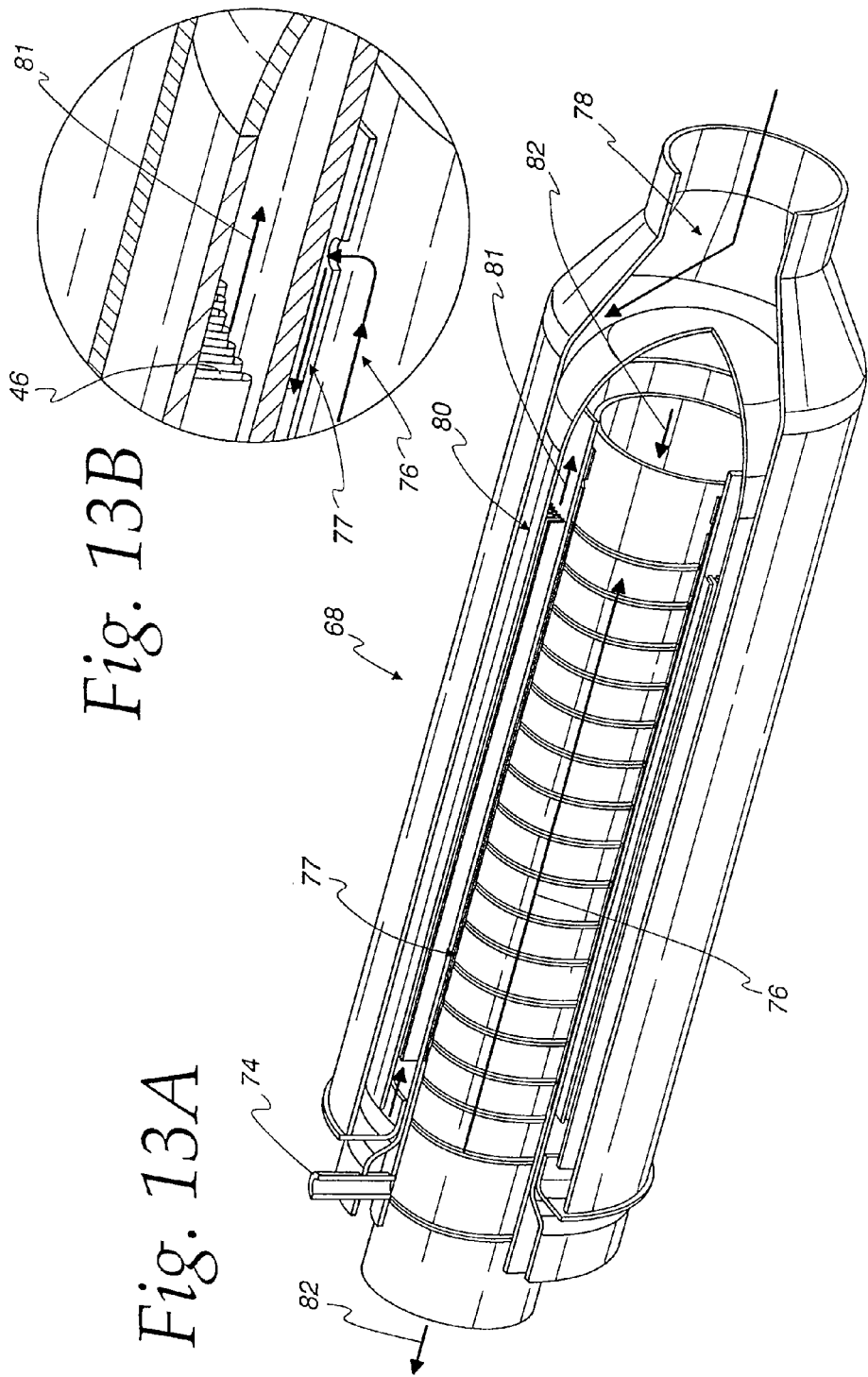

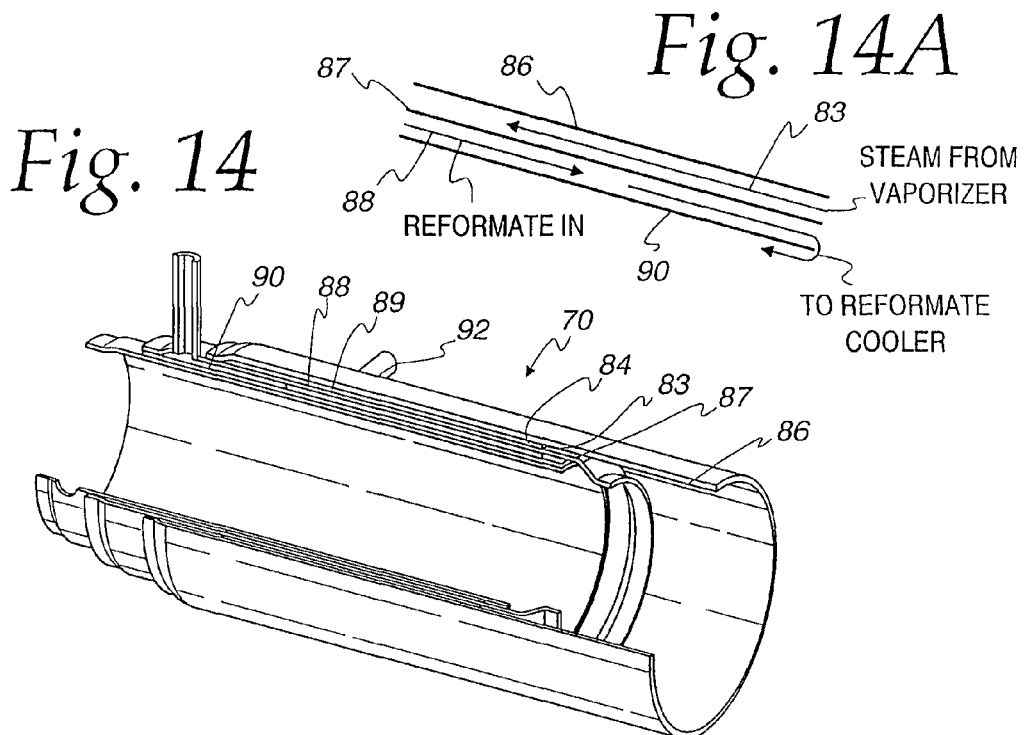
Fig. 14
Fig. 14A
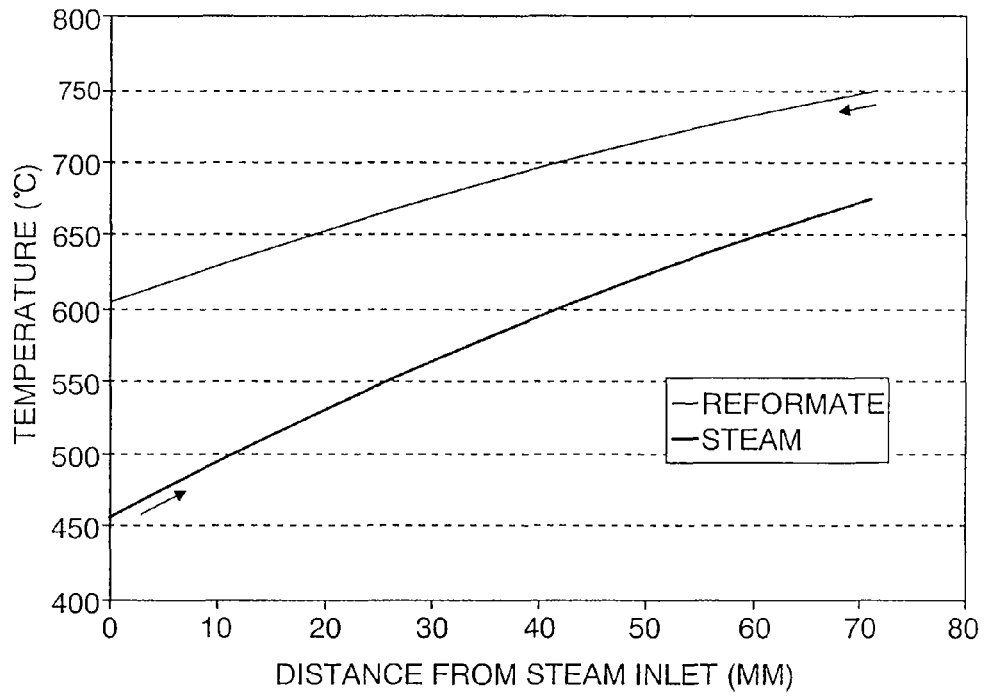
Fig. 15

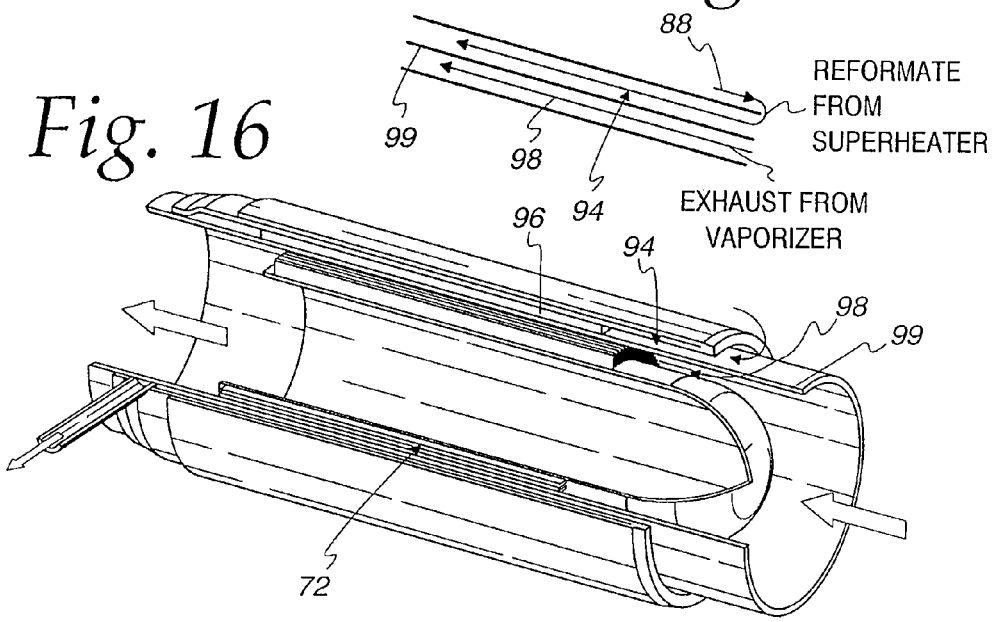
Fig. 16
Fig. 16A
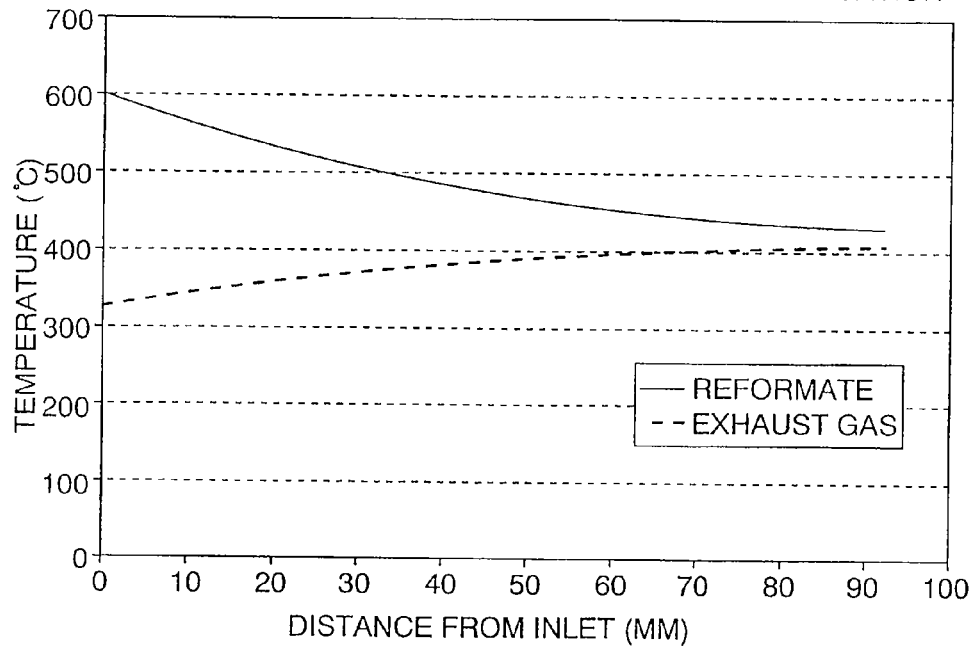
Fig. 17

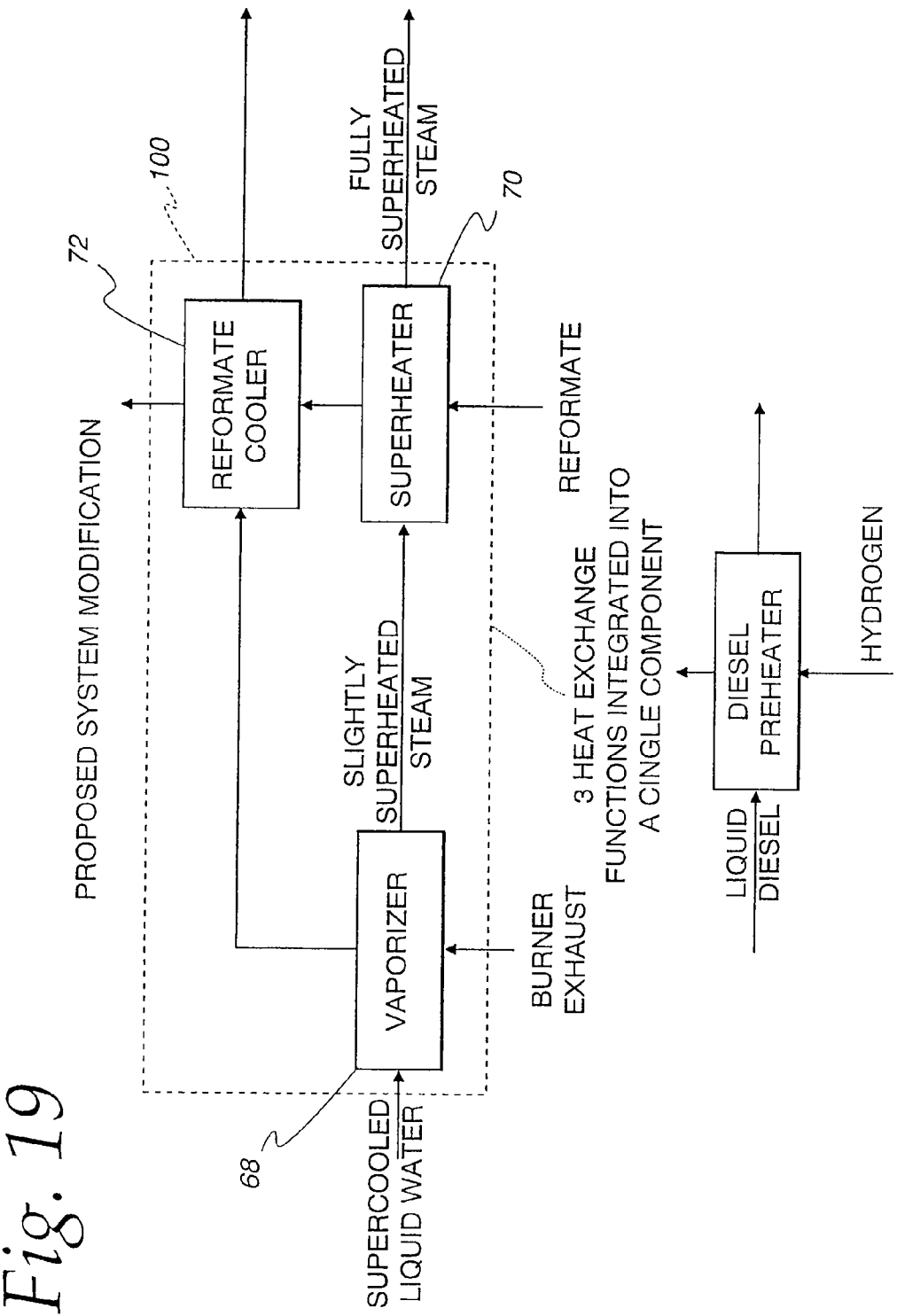

WATER VAPORIZER WITH INTERMEDIATE STEAM SUPERHEATING PASS

CROSS-REFERENCE TO RELATED APPLICATIONS

The present application is a continuation-in-part of co-pending application Ser. No. 11/506,301, filed Aug. 18, 2006, which claims the benefit of Provisional Application Ser. No. 60/709,556, filed Aug. 19, 2005, and the entire contents of both of these applications is hereby incorporated by reference.

FIELD OF THE INVENTION

The present invention relates to heat exchangers, and more particularly, to vaporizing heat exchangers for vaporizing a liquid flow.

BACKGROUND OF THE INVENTION

Water vaporizers are frequently employed in steam reformer based fuel processor systems. In such systems, a hydrocarbon fuel such as natural gas, propane, methanol, gasoline, diesel, etc. is combined with steam and reacted over a catalyst at elevated temperature in order to create a hydrogen-rich gas (reformate) which can be used as a fuel source for a fuel cell anode or as a source of impure hydrogen which can be purified through membrane separation or pressure swing adsorption (PSA) to yield high-purity hydrogen. The water vaporizer serves to vaporize a liquid water source and create superheated steam, which can then be mixed with the gaseous or liquid hydrocarbon fuel source to form the reactants for the steam reforming process. In order to maximize system efficiency, the heat source utilized for vaporization of the liquid water is frequently a high temperature exhaust gas created by combusting unreacted off-gas from the fuel cell anode or PSA or hydrogen separation membrane.

Three distinct regions of heat transfer can typically be identified in such vaporizers. The first region is where the water exists as a subcooled liquid, receiving sensible heating from the heat source fluid; the second region is where the water undergoes vaporization, existing as a two-phase liquid-vapor mixture receiving latent heat from the heat source fluid; the third region is where the water exists as a superheated vapor, again receiving sensible heating from the heat source fluid. The area of sudden transition from the second region to the third region, referred to as the "dryout" location, is typically characterized by a sharp increase in the temperature of the wall separating the heat source fluid and the water flow. This sharp increase is due to the two-phase heat transfer coefficient being substantially higher than the single-phase vapor heat transfer coefficient, resulting in a wall temperature which is relatively close to the vaporizing temperature in the two-phase region and relatively close to the heat source fluid temperature in the superheat region. The temperature gradient is especially pronounced in vaporizers where the fluids flow in a direction counter to one another, and where the inlet temperature of the heat source fluid is substantially higher than the vaporizing temperature of the water. Such a steep temperature gradient over a localized region of the heat exchanger can result in high thermal stresses in that region, leading to the eventual failure of the vaporizer due to thermal fatigue. This problem can be further exacerbated in cases where the water is at a high pressure relative to the heat source fluid, as is frequently the case, since it will subject the wall to large mechanical stresses in addition to the thermal stresses.

Furthermore, fuel cells generally require the operating and cooling fluids to be within specified temperature ranges for each fluid. For example, reformate which is used as fuel at the anode side of the fuel cell generally must be within a specified temperature range for optimal fuel cell operation and also to minimize catalyst degradation. Often, the temperature of a reformate flow is much higher than the maximum input temperature specified for the fuel cell and therefore, the flow must be cooled.

SUMMARY

In some embodiments, the present invention provides an exhaust gas-heated water vaporizer designed to vaporize high pressure liquid water and deliver high temperature, high pressure superheated steam. The vaporizer can include a novel construction and flow circuiting which can provide dramatically reduced thermal stresses at the dryout region, eliminate pressure-induced stresses at the dryout region, and can provide a thermally unconstrained "floating" design, thereby greatly reducing the likelihood of thermal fatigue failure in comparison to known constructions.

In some embodiments, the present invention can improve the manufacturability of a vaporizing heat exchanger including an intermediate steam superheating pass, without a commensurate decrease in the heat exchange performance of the heat exchanger.

An exemplary embodiment of the invention achieves the foregoing in a water vaporizer with an intermediate steam superheating pass that includes a first flow path connected to a water inlet port, a second flow path connected to a steam outlet port and receiving a partially superheated steam flow from the first flow path, and a third flow path connected to an exhaust inlet port and an exhaust outlet port. The second flow path can include a first convoluted fin to enable effective transfer of heat from the flow passing through the third flow path to the flow passing through the second flow path, and a second convoluted fin to enable effective transfer of heat from the flow passing through the second flow path to the flow passing through the first flow path.

In some embodiments, the present invention provides a water vaporizer including a first flow path connected to a water inlet, a second flow path for receiving superheated water vapor from the first flow path and being connected to a vapor outlet to exhaust the superheated water vapor, and a third flow path extending between an exhaust inlet and an exhaust outlet and being oriented to transfer heat from an exhaust flow to the superheated water vapor. The water vaporizer can also include a first convoluted fin positioned along the second flow path, and a second convoluted fin positioned along the second flow path adjacent to and separated from the first fin to define a gap extending between the first and second fins along a length of the first fin in a direction substantially parallel to the exhaust flow along the third flow path.

The present invention also provides a water vaporizer including a first flow path connected to a water inlet, a second flow path for receiving water vapor from the first flow path and being connected to a vapor outlet to exhaust the water vapor, and a third flow path extending between an exhaust inlet and an exhaust outlet, the first, second, and third flow paths being substantially concentric. The water vaporizer can include a first convoluted fin extending into the second flow path for transferring heat from a flow of exhaust traveling along the third flow path to the water vapor traveling along the second flow path, and a second convoluted fin extending into the second flow path and being arranged interior of the first fin for transferring heat from the water vapor traveling along the second flow path to a flow traveling along the first flow path.

In some embodiments, the present invention provides a water vaporizer including a first flow path connected to a water inlet, a second flow path for receiving superheated water vapor from the first flow path and being connected to a water vapor outlet to exhaust a superheated water vapor, and a third flow path extending between an exhaust inlet and an exhaust outlet. The water vaporizer can also include a convoluted fin extending into the second flow path for transferring heat from a flow of exhaust traveling along the third flow path to a flow traveling along one of the first and second flow paths, the second flow path having a bypass around the fin. In some embodiments, a width of the bypass along a length of the second flow path in a direction substantially parallel to the flow of exhaust along the third flow path can be less than a width between adjacent convolutions of the fin.

The present invention also provides a method of assembling a water vaporizer including the acts of securing a first convoluted fin to an exterior of a first wall, securing a second convoluted fin to an interior of a second wall, and supporting the first and second walls in a housing so as to provide a first flow path defined by the first wall, a second flow path defined between the first and second walls, and a third flow path between the second wall and an interior of the housing and extending between an exhaust inlet and an exhaust outlet.

Other objects, features, and advantages of the invention will become apparent from a review of the entire specification, including the appended claims and drawings.

BRIEF DESCRIPTION OF THE DRAWINGS

FIG. 1 is a perspective view of the exterior of a vaporizer according to some embodiments of the present invention;

FIG. 2 is a diagrammatic representation of the flow paths and separating walls of an embodiment of a vaporizer;

FIG. 3 is a partial cut-away view showing exhaust gas heat transfer surfaces of an embodiment of a vaporizer;

FIG. 3A is an enlarged view of the indicated part of FIG. 3;

FIG. 4 is a partial cut-away view showing a super-heated steam transfer surface of an embodiment of a vaporizer;

FIG. 4A is an enlarged view of the indicated part of FIG. 4;

FIG. 7 is a cross-sectional view of an embodiment of a vaporizer depicting a steam flow path;

FIG. 8 is a cross-sectional view of an embodiment of a vaporizer depicting an exhaust gas flow path;

FIG. 12 is a partial cut-away view of an embodiment of a vaporizer and combined reformate cooler;

FIG. 13A is a partial cut-away view of the vaporizer section of the vaporizer and combined reformate cooler of FIG. 12;

FIG. 13B is an enlarged view of the indicated part of FIG. 13A;

FIG. 14 is a partial cut-away view of the superheater section of the vaporizer and combined reformate cooler of FIG. 12;

FIG. 14A is a diagrammatic representation of the flows in the structure of FIG. 14;

FIG. 15 is a graph depicting the temperature profiles of fluids flowing in the superheater section of FIG. 14;

FIG. 16 is a partial cut-away view of the reformate cooler section of the vaporizer and combined reformate cooler of FIG. 12;

FIG. 16A is a diagrammatic representation of the flows in the structure of FIG. 16;

FIG. 17 is a graph depicting the temperature profiles of fluids flowing in the reformate cooler section of FIG. 16;

FIG. 19 is a diagrammatic representation of a vaporizer and combined reformate cooler.

DETAILED DESCRIPTION

Figures 5, 6:
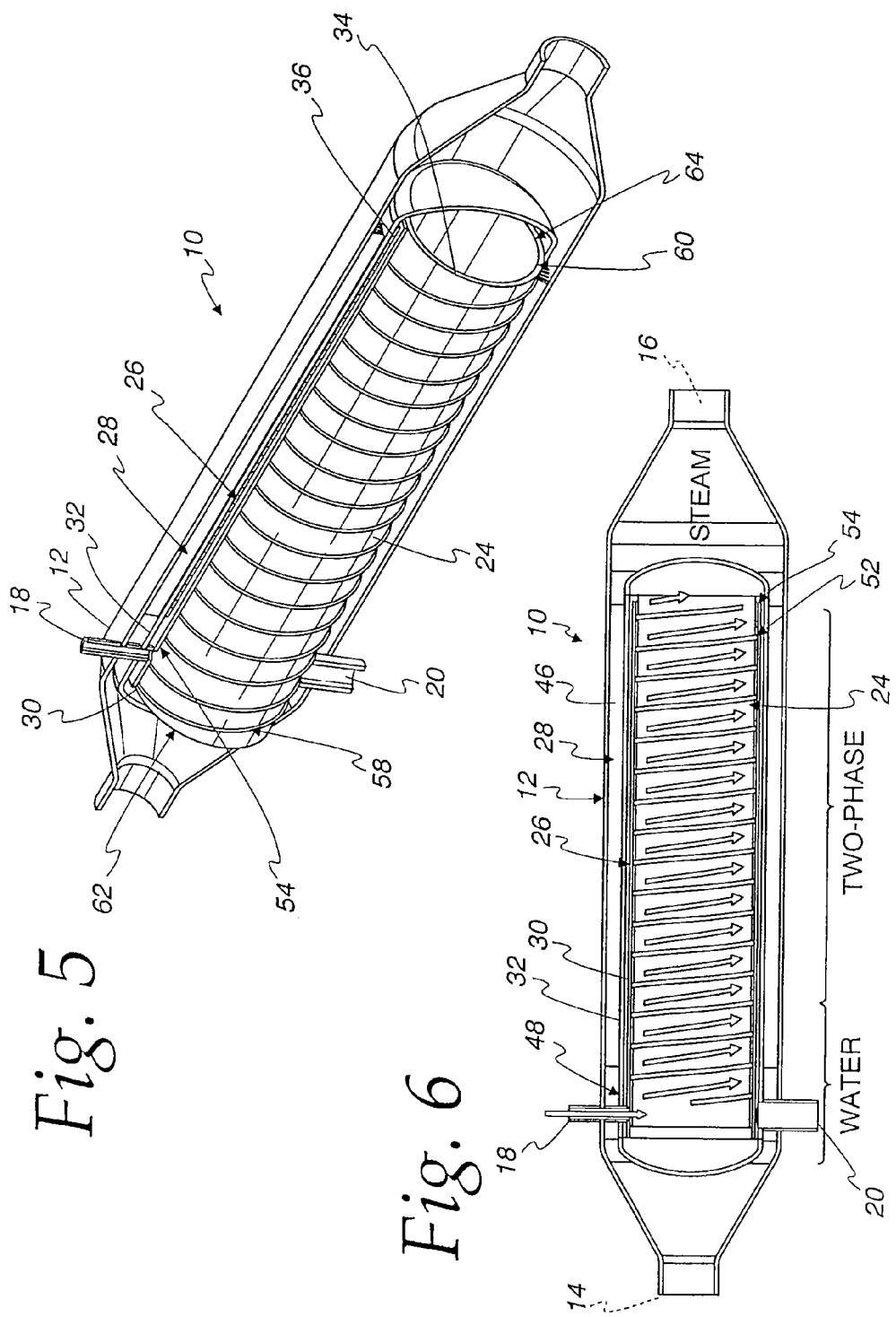
FIG. 5 is a partial cut-away view showing a first flow path of an embodiment of a vaporizer.
FIG. 6 is a cross-sectional view of an embodiment of a vaporizer depicting water flow along a first flow path.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In one embodiment, referring to FIG. 1, a water vaporizer 10 is shown which includes a long tubular housing 12 which reduces down to smaller diameter tubes at both ends, these being the exhaust gas inlet and outlet ports 14 and 16. At the exhaust inlet end, water inlet and steam outlet ports 18 and 20 enter the water vaporizer 10 in a direction perpendicular to the axis 22 of the vaporizer tube.

FIG. 2 is a diagrammatic representation of the flow paths through the vaporizer. The vaporizer 10 has a first flow path 24 connected to the water inlet port 18, a second flow path 26 connected to the steam outlet port 20, and a third flow path 28 connected to the exhaust inlet and exhaust outlet ports 14 and 16. The first and second flow paths 24 and 26 are separated by a first cylindrical wall 30 (referred to as "separating wall 1"); the second and third flow paths 26 and 28 are separated by a second cylindrical wall 32 (referred to as "separating wall 2"). These two cylindrical separating walls 30 and 32 are concentric to each other and to the outer housing 12 of the vaporizer 10, with the second cylindrical wall 32 being of a larger diameter than the first cylindrical wall 30. The ends 34 and 36 of the first and second flow paths 24 and 26 located at the exhaust outlet end of the water vaporizer 10 are connected together, so that water can flow into the water vaporizer 10 through the water inlet port 18, travel through the first flow path 24, then travel through the second flow path 26 in a direction counter to its flow through the first flow path, and then flow out of the water vaporizer 10 through the steam outlet port 20.

Thus, in operation, water enters the vaporizer 10 through the water inlet port 18, and flows through the first flow path 24. Heat is transferred into the water through separating wall 30 at a rate $Q_1$, the magnitude of which varies with location along the flow path 24. The first flow path 24 consists of a subcooled liquid region 40 closest to the water inlet 18, followed by a vaporizing region 42, followed by a superheated vapor region 44 closest to the end 34 of the first flow path 24. The water exits the first flow path 24 as a slightly superheated vapor, and flows back through the second flow path 26 toward the steam outlet 20. Along the second flow path 26, heat is transferred into the water vapor through separating wall 32 at a rate $Q_2$, the magnitude of which varies with location along the flow path, and heat is transferred out of the water vapor through separating wall 30 at the previously mentioned location-dependant rate $Q_1$. It should be understood that the location and existence of the sub-cooled, vaporizing and superheated regions 40, 42 and 44 may vary depending upon the temperature flow rates of the various fluids. The location of these regions shown in FIG. 2 is merely one embodiment.

FIG. 3 is a partial cut-away view showing the exhaust gas heat transfer surfaces in the third flow path 28. As best seen in enlarged detail in FIG. 3A, a convoluted fin, such as, for example, a serpentine louvered fin 46, is wrapped around and brazed to a cylinder 48 which forms separating wall 32. However, it should be understood by those skilled in the art that other forms of heat transfer surfaces are also contemplated. For example, plain fins, slots, or the like are also suitable. The cylinder 48 is capped at both ends with heads 50 and 53 designed to withstand the internal pressure loads imposed by the elevated pressure of the water, relative to the exhaust gas. The water inlet and steam outlet ports 18 and 20 penetrate into the cylinder 48 which forms the separating wall 32.

FIG. 4 is a partial cut-away view showing the superheated steam heat transfer surfaces in the second flow path 26. As best seen in enlarged FIG. 4A, another convoluted fin 52 is wrapped around and brazed to a cylinder 54 which forms separating wall 30, as well as being brazed to the inner wall of the cylinder 48 which forms separating wall 32.

Figure 11A:
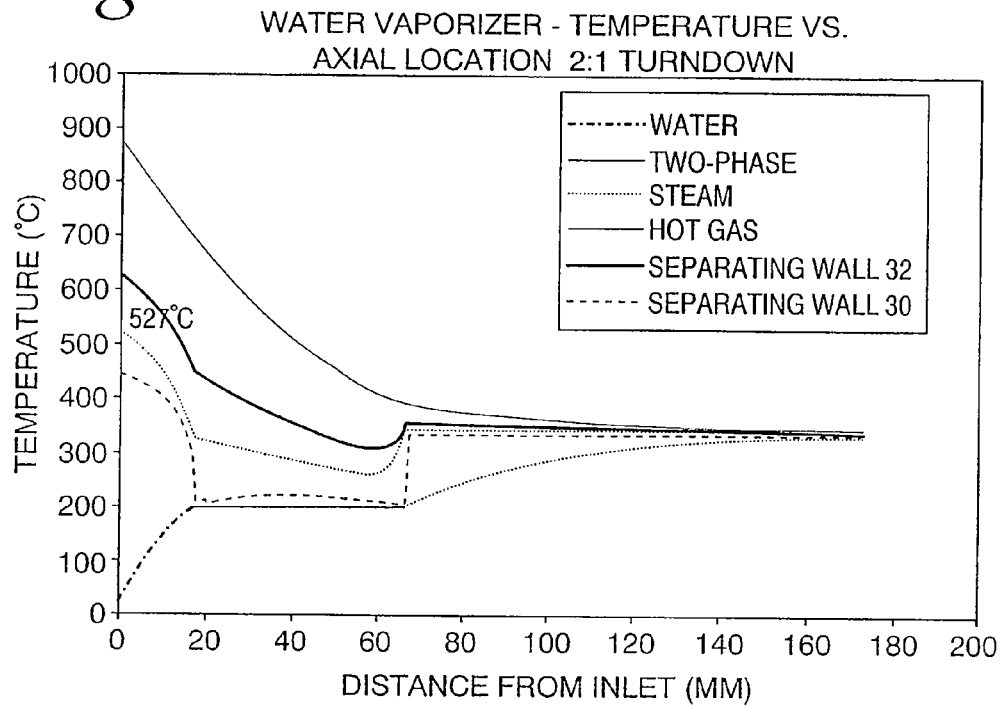
FIGS. 11A and 11B are graphs comparing the temperature profiles of fluids flowing in the vaporizer of FIG. 1 to the fluids in a conventional counter-flow vaporizer, each operating at 2:1 turndown.
Figure 11B:
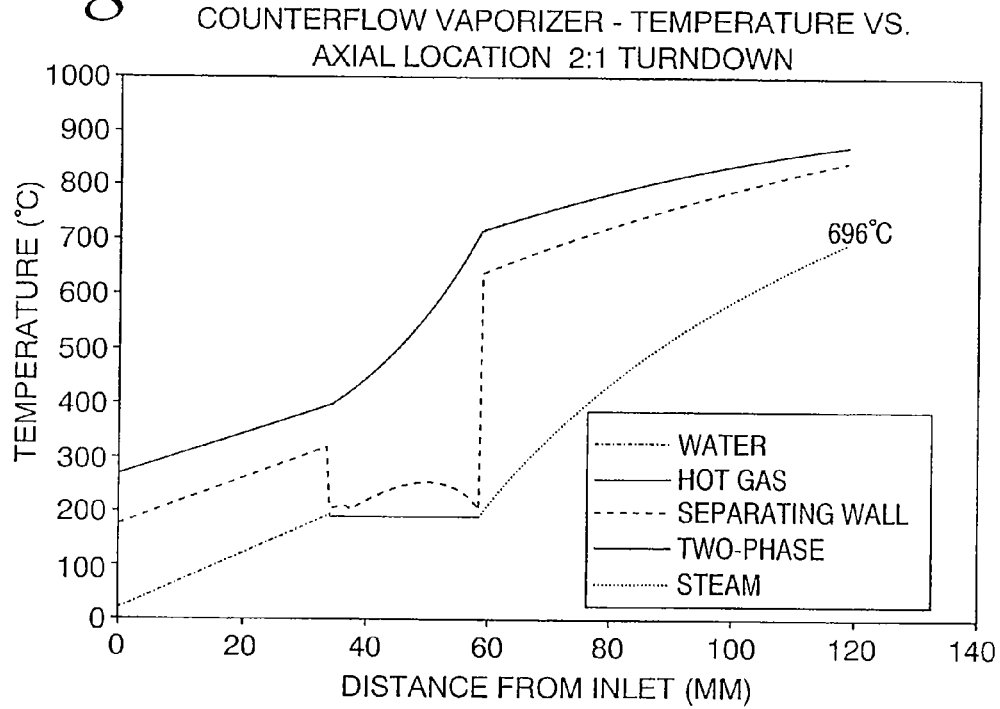
Figure 11C:
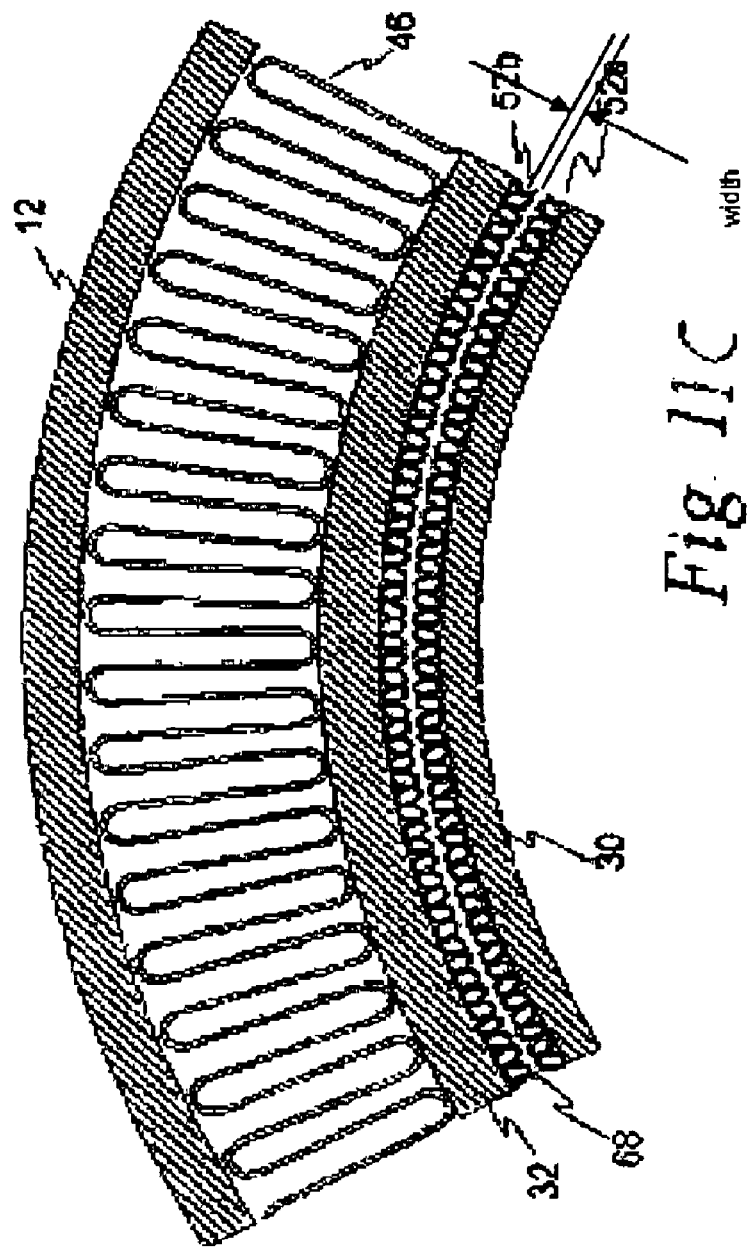
FIG. 11C is an enlarged, partially sectional view of the vaporizer of FIG. 3, as taken long lines 11C-11C in FIG. 3.

In the illustrated embodiment of FIG. 11C, a gap 68 is formed between the outermost surfaces of a first convoluted fin 52a and the innermost surfaces of an adjacent second convoluted fin 52b. The gap 68 can extend between opposite ends of the second flow path 26 in a direction substantially parallel to a flow through the second flow path 26 and substantially parallel to a flow of exhaust through the third flow path 28. The gap 68 can provide sufficient clearance for the assembly of the cylinder 54 with the brazed-on first fin 52a into the cylinder 48 with brazed-on second fin 52b. In some embodiments, the height of the gap 68 will be similar to the spacing of adjacent convolutions of the first fin 52a and/or adjacent convolutions of the second 52b so as not to provide a preferential flow path bypassing the first and second fins 52a, 52b. In some embodiments, the convoluted fins 52a and 52b will be of a type that promotes fluid mixing, such as, for example, the lanced and offset structure illustrated in FIG. 4a, so that movement of the steam between the first and second fins 52a, 52b is promoted. It should be appreciated by one skilled in the art that other types of fins, such as, for example, serpentine, louvered, and the like, would also be capable of achieving similar results.

The beginning and ending locations of the first and second fins 52a, 52b can substantially coincide with the beginning and ending locations of the previously mentioned fin 46 for the exhaust gas. The water inlet port 18 penetrates through the cylinder 54 which forms separating wall 30, while the steam outlet port 20 is open to the annulus 56 between separating wall 30 and separating wall 32 so that it can receive the steam flow exiting the first and second fins 52a and 52b.

It should be understood that the fin 52, or alternatively, the first and second fins 52a, 52b may also or alternatively be permitted to remain unbonded to one or more of the separating walls 30 and 32. This may also allow the walls 30 and 32 to expand independent of one another. With reference to the illustrated embodiment of FIGS. 1-8, the beginning and ending locations of the fin 52 can coincide with the beginning and ending locations of the previously mentioned fin 46 for the exhaust gas. The augmented fin 52 shown in FIGS. 4 and 4A is of the lanced and offset type, although other types of fins, such as for example serpentine louvered, would also work. The water inlet port 18 penetrates through the cylinder 54 which forms separating wall 30, while the steam outlet port 20 is open to the annulus 56 between separating wall 30 and separating wall 32 so that it can receive the steam flow exiting the fin 52.

FIG. 5 is a partial cut-away view showing the first flow path 24, in which the incoming liquid water is sensibly heated, vaporized, and slightly superheated. The flow path 24 is a helical path which is bounded on one side by the inner surface of the cylinder 54 which forms separating wall 30. Several manufacturing methods could be used to fabricate this flow path; as depicted in FIG. 5, the flow path 24 is created through the machining of a helical groove 58 into the outer diameter of a thick-walled cylinder 60, the outside diameter of which is brazed to the inside diameter of the cylinder 54 which forms separating wall 30. Again, these surfaces may also be left unattached to one another. The flow path 24 begins some distance in from the end 62 of the cylinder 60 nearest the water inlet and steam outlet ports 18 and 20, so that a complete seal can be made at the end 62 to prevent any water from bypassing the first and second vaporizer flow paths 24 and 26. The water inlet port 18 is open to the helical flow path 24 so that liquid water can enter the flow path through the port 18. At the opposite end, the flow path 24 continues all the way to the end 64 of the cylinder 60 so that the partially superheated steam can flow from the end 34 of the first flow path 24 into the beginning 36 of the second flow path 26. The cylinder 48 is capped at this end so that the steam flow is forced to return through the second flow path 26. The evenness of distribution of the steam flow exiting the first flow path 24 and entering the second flow path 26 is improved by transitioning from the helical flow path 24 to the annular flow path 26 at the end of the first flow path 24, as is shown in FIGS. 4 and 5. While not required, it may be advantageous to vary the width of the helical flow path 24 along the path's length, in order to best accommodate the large changes in density which occur as the water transitions from a high-density subcooled liquid to a low-density superheated vapor.

Additionally, it should be understood that other forms of this flow path are contemplated besides helical flow paths. The structure depicted in FIG. 5 is merely one embodiment.

FIGS. 6, 7, and 8 are longitudinal cross-sectional views of the vaporizer 10 which illustrate the flow of the fluids through the first, second, and third flow paths 24, 26 and 28, respectively.

Figure 9:
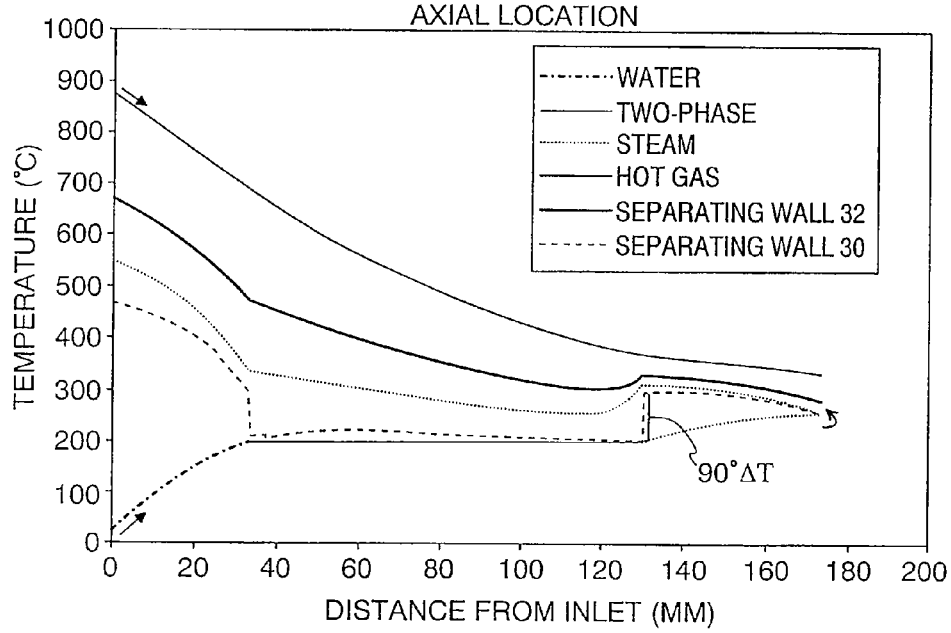
FIG. 9 is a graph depicting the temperature profiles of fluids flowing in the vaporizer of FIG. 1.

In one example, using the vaporizer 10 of FIG. 1, the predicted bulk temperature profiles of the fluids and the predicted average separating wall temperatures along the length of the vaporizer are depicted in the graph in FIG. 9. The design case shown is for a 25° C. water flow at 15 bar absolute pressure which is heated to a superheated steam flow exiting at 550° C. The heat source is a combustor exhaust gas which enters at 875° C. and is cooled down to an exit temperature of 330° C.

Several observations can be made about the data shown in the graph. The predicted temperature profile of separating wall 32 is free of any steep temperature gradients, thus minimizing the potential for excessive thermal stress cycling of the wall 32. In addition, the maximum predicted temperature of the wall 32 is approximately 700° C., at the exhaust gas inlet end of the vaporizer 10. This temperature, while high, is substantially below the incoming exhaust temperature of 875° C. The predicted temperature profile of separating wall 30 shows substantially lower temperatures than was seen for separating wall 32. While there are steep temperature gradients in the wall 30 at the beginning and end of the two-phase region, they are limited to a temperature range of only approximately 90° C. More importantly, there is no pressure-induced stress on the wall 30, since it separates two flow paths 24 and 26 which are at essentially the same pressure.

Figure 10:
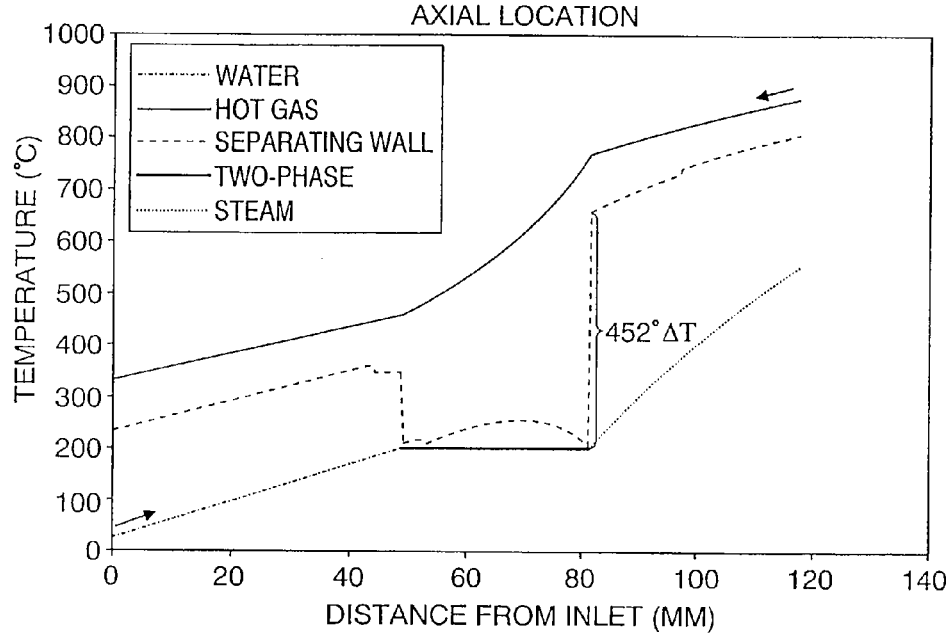
FIG. 10 is a graph depicting the temperature profiles of fluids flowing in a conventional counter-flow vaporizer.

As a comparison, FIG. 10 shows the predicted fluid and wall temperature profiles for a more traditional single pass counterflow vaporizer which has been sized to meet the same conditions as used for FIG. 9. It should be immediately obvious that the steep temperature gradient at the end of the vaporizing region is much more severe than was seen in the embodiment of the vaporizer 10 shown in FIG. 9 (approximately 452° C. vs. 90° C.). In addition, this wall is now subjected to a large pressure loading due to the pressure differential between the high pressure water flow and the near atmospheric exhaust gas flow. Thermal cyclic fatigue failure of the separating wall in this highly stressed region is expected to occur much sooner than would be expected for the embodiment of the vaporizer 10 shown in FIG. 9. It should also be noted that the peak temperature of the separating wall for this traditional design is approximately 800° C., or about 100° C. higher than is expected for the embodiment shown in FIG. 9. At these operating temperatures, such a difference may require the selection of a more expensive material for the separating wall in the traditional design than would be required for the embodiment of the vaporizer 10 shown in FIG. 9.

The disclosed embodiment of the vaporizer 10 can provide additional advantages over more traditionally known designs. For example, the cylindrical shapes of the pressure boundaries can help distribute the pressure loading, which can result in lower stress levels in the structure. Stress risers due to tube-header joints may be eliminated. The water inlet and steam outlet ports 18 and 20 are located at the same axial location, therefore the water ports 18 and 20 do not place a constraint on the axial expansion and contraction of the structure.

The present invention can also provide greater stability over turndown operation in comparison to more traditional designs. As the flow is reduced, a traditional vaporizer may show an increase in heat transfer effectiveness, leading to increased steam outlet temperatures. In this type of application, where the hot gas inlet temperature is substantially above the desired steam outlet temperature, the potential for overheating of the steam is especially great. In the present invention, this situation is largely mitigated because the hot gas and the incoming water flow in a concurrent direction. This results in a temperature "pinch" at the hot gas exit end of the vaporizer 10, where the exhaust gas and the superheated steam exiting the first flow path 24 and entering the second flow path 26 reach approximately equal temperatures, with relatively little heat transfer occurring over the flow paths 24 and 26, and 28 near that end of the heat exchanger 10. This dramatically limits the increase in effectiveness which occurs as the flows are reduced. FIGS. 11A and 11B show the predicted temperature profiles for both the traditional design and the disclosed design 10, respectively, as the flows are reduced by 50% (2:1 turndown). It can be seen that the steam outlet temperature in the traditional design increases by 146°, from 550° C. to 696° C. In the disclosed design 10, the steam exit temperature actually decreases by 23°, from 550° C. to 527° C. While the disclosed design does not maintain a constant steam exit temperature over turndown, it is substantially more stable than a traditional vaporizer design would be.

Since the cylinder 54 and the cylinder 48 are both brazed independent of one another, and a gap 68 exists between the first convoluted fin 52a brazed onto the cylinder 54 and the second convoluted fin 52b brazed onto the cylinder 48, the two cylinders are easily assembled into one another. Furthermore, the two cylinders are allowed to thermally expand independent of one another, thereby reducing the thermal stresses which may be induced in the cylinders during operation.

Yet another embodiment is illustrated in FIG. 12. In this embodiment, a vaporizer section 68 also integrates a superheater 70 for the vaporized flow and a reformate cooler portion 72 for cooling a reformate flow, such as a reformate flow in a steam reformer system. It should be understood that while this embodiment discloses the portion 72 to cool a reformate flow, other fluids may also be cooled in the portion 72. In this embodiment, water is vaporized and superheated in the vaporizer section 68, but the exhaust and superheated steam exit the vaporizer section 68 where the steam is superheated further by the reformate, and the reformate is then further cooled by the exhaust gas flow from the vaporizer section 68.

The vaporizer section 68 of this embodiment is illustrated in more detail in FIGS. 13A and 13B. Water enters through an inlet port 74 near the left hand side of the vaporizer section 68 and travels along a helical flow path 76 similar to the flow path 24 illustrated in FIGS. 4-5, and then turns and flows back along a second flow path 77, as best seen in FIG. 13B, that is similar to the flow path 26 shown in FIGS. 4 and 5. In fact, the relationship between the water and steam flows and the exhaust flow is similar to the flow relationships illustrated in FIG. 2, with the steam in the flow path 77 receiving heat from the exhaust gas and transferring heat to the water flow in the flow path 76. The main difference is that initially, the exhaust enters at the opposite end 78, of the vaporizer section 68 of FIG. 13 and therefore, makes an initial adiabatic pass 80 which is not in contact with the steam flow before reversing direction and flowing through a path 81 in a counter-current flow heat exchange relationship with the steam flow in path 77.

In the embodiment illustrated in FIGS. 13A and 13B, the exhaust gas makes a final pass 82 through the center of the vaporizing section 68, exits the vaporizer section 68, and enters the reformate cooler section 72 while the steam exits the vaporizer section 68 and enters the superheater section 70 which is concentric about the reformate cooler section 68.

The structure of the superheater section 70 and the reformate cooler portion 72 are shown in FIG. 14, with a diagrammatic representation of the steam and reformate flows through the superheater 70 illustrated in FIG. 14A. The steam flows through a pass 83 having a finned structure 84 which is bounded by an outermost cylindrical wall 86 and an adjacent cylindrical wall 87. The reformate flows through a pass 88 having a finned structure 89 bounded by the adjacent wall 87 and an inner wall 90 in a counter-current direction to the flow of the steam. While the reformate enters at an elevated temperature, the steam enters the superheater section 70 with significant superheat and therefore the amount of heat that is transferred is reduced. The passes 83 and 88 are concentric annular flow passages, with the pass 83 being radially outboard of the pass 88, and heat being transferred from the reformate to the steam through the cylindrical wall 87. Once the steam passes through this section 70, it exits the structure through an outlet port 92. FIG. 15 illustrates the temperature profiles of one embodiment wherein the reformate is used to add additional superheat to the steam flow in the superheater section 70.

The reformate generally may require additional cooling and therefore the reformate cooler structure 72 is included. Once the reformate makes the first pass 88 in heat exchange relationship with the steam, it may be transferred to an additional inner, return pass 94 for further cooling. As illustrated in FIGS. 16 and 16A, the reformate makes the return pass 94 through a finned structure 96 which is concentric with an annular flow path 98 for the exhaust gas. The reformate flow pass 94 is located in a radially outer annular passage relative to the exhaust flow path 98 and separated by a cylindrical wall 99, with heat being transferred from the reformate to the exhaust through the wall 99. As seen in FIGS. 16-16A, the reformate and the exhaust gas flow in a concurrent-flow relationship and therefore the two flows exit the reformate cooler section at similar temperatures. FIG. 17 illustrates the temperature profiles of one embodiment of the reformate flow and exhaust gas flow. As seen in this graph, the reformate flow enters the reformate cooler 72 at an elevated temperature, but as the reformate exits the structure 72, its temperature has been greatly reduced and approaches a common outlet temperature with the exhaust gas.

Figure 18:
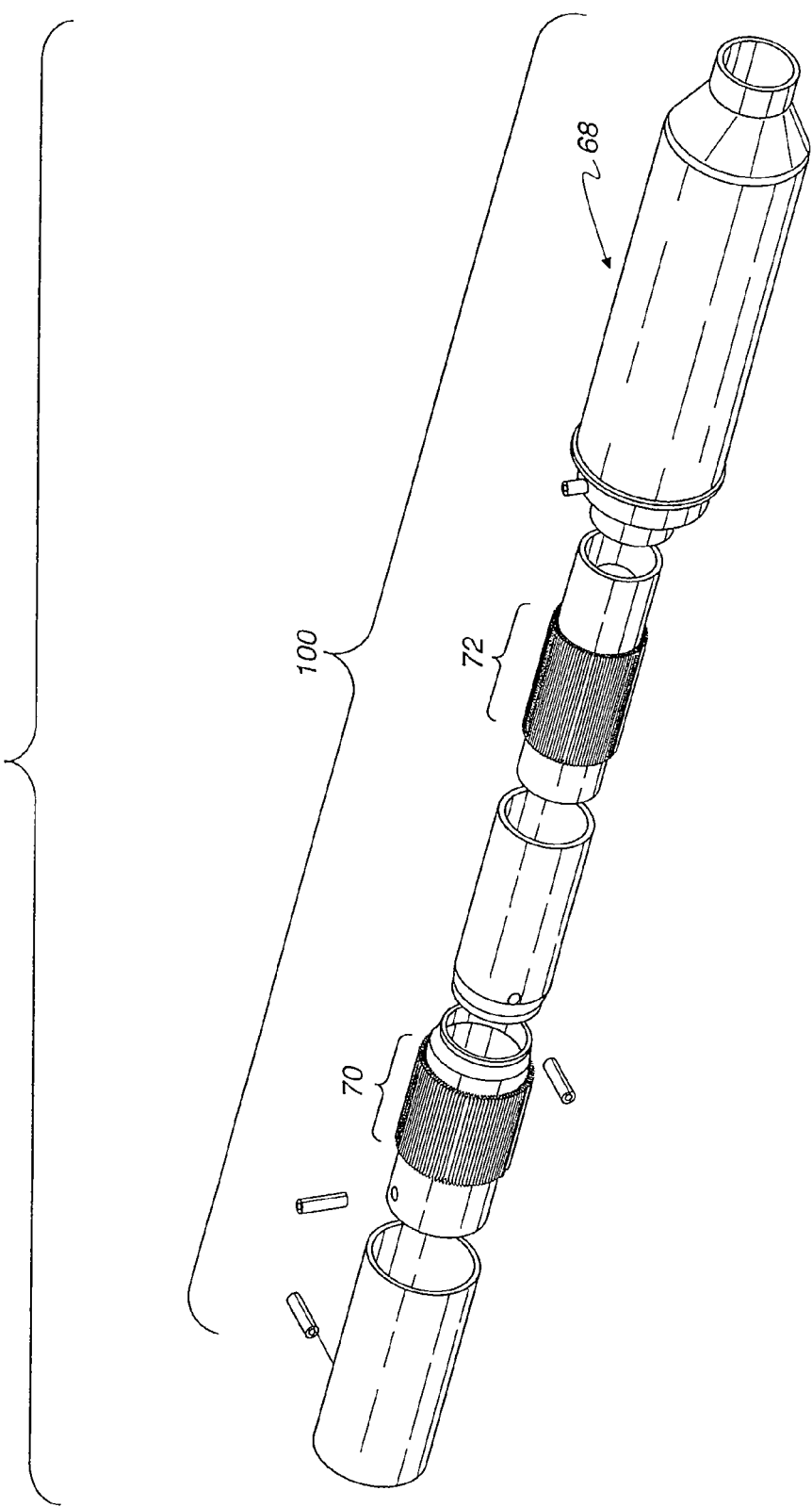
FIG. 18 is an exploded view of an embodiment of a vaporizer and combined reformate cooler.

Finally, as illustrated in FIGS. 12 and 18 and diagrammatically in FIG. 19, the vaporizer 68, superheater 70, and reformate cooler structure 72 can be designed and assembled into a unitary structure 100. The overall shape enhances ease of assembly. Furthermore, the cylindrical shapes of the components resist pressure differences that may exist between the various flows and the symmetric design helps restrict or eliminate warping of the heat exchangers due to temperature differentials. Additionally, the structure 100 may be constructed to allow the individual components to expand and contract independently in response to thermal changes.

Various alternatives and embodiments are contemplated as being within the scope of the following claims particularly pointing out and distinctly claiming the subject matter regarded as the invention.

What is claimed is:

1. A water vaporizer comprising:
a first flow path connected to a water inlet;
a second flow path for receiving superheated water vapor from the first flow path and being connected to a vapor outlet to exhaust the superheated water vapor;
a third flow path extending between an exhaust inlet and an exhaust outlet and being oriented to transfer heat from an exhaust flow to the superheated water vapor;
a first convoluted fin positioned along the second flow path; and
a second convoluted fin positioned along the second flow path adjacent to and separated from the first fin to define a gap extending between the first and second fins along a length of the first fin in a direction substantially parallel to the exhaust flow along the third flow path, wherein the gap is located in the second flow path.

2. The water vaporizer of claim 1, wherein the first fin is operable to transfer heat from the exhaust flow to the superheated water vapor traveling along the second flow path, and wherein the second fin is arranged interior of the first fin for transferring heat from the superheated water vapor traveling along the second flow path to a flow traveling along the first flow path.

3. The water vaporizer of claim 1, further comprising a housing supporting a pair of concentric walls, which at least partially define the second flow path, and wherein the first fin extends inwardly from one of the pair of concentric walls and the second fin extends outwardly from an other of the pair of concentric walls.

4. The water vaporizer of claim 3, wherein the first fin is secured to the one of the pair of concentric walls and the second fin is secured to the other of the pair of concentric walls.

5. The water vaporizer of claim 1, wherein the water inlet and the vapor outlet are substantially aligned along a common axis substantially perpendicular to an axis extending between the exhaust inlet and outlet.

6. The water vaporizer of claim 1, wherein the first, second, and third flow paths are substantially coaxial.

7. The water vaporizer of claim 1, wherein a width of the gap defined between the first and second fins is no greater than a distance between adjacent convolutions of the first fin.

8. The water vaporizer of claim 1, wherein the flow of exhaust along the third flow path is counter to a flow of superheated water vapor along the adjacent second flow path.

9. The water vaporizer of claim 8, wherein the flow of superheated water vapor along the second flow path is counter to a flow along the adjacent first flow path.

10. The water vaporizer of claim 1, wherein the second flow path is positioned between the first and third flow paths such that heat is transferred from the exhaust flow in the third flow path to the superheated water vapor in the second flow path and from the superheated water vapor in the second flow path to a flow in the first flow path.

11. A water vaporizer comprising:
a first flow path connected to a water inlet;
a second flow path for receiving water vapor from the first flow path and being connected to a vapor outlet to exhaust the water vapor;
a third flow path extending between an exhaust inlet and an exhaust outlet, the first, second, and third flow paths being substantially concentric;
a first convoluted fin extending into the second flow path for transferring heat from a flow of exhaust traveling along the third flow path to the water vapor traveling along the second flow path; and
a second convoluted fin extending into the second flow path and being arranged interior of the first fin for transferring heat from the water vapor traveling along the second flow path to a flow traveling along the first flow path;
wherein the second convoluted fin is separated from the first convoluted fin to define a gap, wherein the gap is positioned in the second flow path.

12. The water vaporizer of claim 11, wherein the gap extends between the first and second fins along a length of the first fin in a direction substantially parallel to an exhaust flow along the third flow path.

13. The water vaporizer of claim 11, further comprising a housing supporting a pair of concentric walls, which at least partially define the second flow path, and wherein the first fin extends inwardly from one of the pair of concentric walls and the second fin extends outwardly from an other of the pair of concentric walls.

14. The water vaporizer of claim 13, wherein the first fin is secured to the one of the pair of concentric walls and the second fin is secured to the other of the pair of concentric walls.

15. The water vaporizer of claim 11, wherein the water inlet and the vapor outlet are substantially aligned along a common axis substantially perpendicular to an axis extending between the exhaust inlet and outlet.

16. The water vaporizer of claim 11, wherein a width defined between the first and second convoluted fins is no greater than a distance between adjacent convolutions of the first fin and no greater than a distance between adjacent convolutions of the second fin.

17. The water vaporizer of claim 11, wherein the flow of exhaust along the third flow path is counter to the flow of water vapor along the second flow path.

18. The water vaporizer of claim 11, wherein the flow of water vapor along the second flow path is counter to the flow along the first flow path.

19. The water vaporizer of claim 11, wherein the second flow path is positioned between the first and third flow paths such that heat is transferred from the flow of exhaust in the third flow path to the water vapor in the second flow path and from the water vapor in the second flow path to the flow in the first flow path.

20. A water vaporizer comprising:
a first flow path connected to a water inlet;
a second flow path for receiving superheated water vapor from the first flow path and being connected to a water vapor outlet to exhaust a superheated water vapor;
a third flow path extending between an exhaust inlet and an exhaust outlet; and
a convoluted fin extending into the second flow path for transferring heat from a flow of exhaust traveling along the third flow path to a flow traveling along one of the first and second flow paths, the convoluted fin having a first plurality of crests and a second plurality of crests opposite the first plurality of crests, the first plurality of crests defining a plurality of valleys between adjacent crests of the first plurality of crests, the second flow path having a bypass around the fin such that the plurality of valleys are in fluid communication with each other;
wherein a width of the bypass along a length of the second flow path in a direction substantially parallel to the flow of exhaust along the third flow path is no greater than a width between adjacent convolutions of the fin.

21. The water vaporizer of claim 20, wherein the fin is a first fin operable to transfer heat from the flow of exhaust traveling along the third flow path to the water vapor traveling along the second flow path, and further comprising a second convoluted fin arranged interior of the first fin for transferring heat from the water vapor traveling along the second flow path to a flow traveling along the first flow path.

22. The water vaporizer of claim 21, further comprising a housing supporting a pair of concentric walls, which at least partially define the second flow path, and wherein the first fin extends inwardly from one of the pair of concentric walls and the second fin extends outwardly from an other of the pair of concentric walls.

23. The water vaporizer of claim 22, wherein the first fin is secured to the one of the pair of concentric walls and the second fin is secured to the other of the pair of concentric walls.

24. The water vaporizer of claim 20, wherein the water inlet and the vapor outlet are substantially aligned along a common axis substantially perpendicular to an axis extending between the exhaust inlet and outlet.

25. The water vaporizer of claim 20, wherein the first, second, and third flow paths are substantially coaxial.

26. The water vaporizer of claim 20, wherein the flow of exhaust along the third flow path is counter to a flow of water vapor along the adjacent second flow path.

27. The water vaporizer of claim 26, wherein the flow of water vapor along the second flow path is counter to the flow along the adjacent first flow path.

28. The water vaporizer of claim 20, wherein the second flow path is positioned between the first and third flow paths such that heat is transferred from the exhaust flow in the third flow path to the water vapor in the second flow path and from the water vapor in the second flow path to the flow in the first flow path.

* * * * *